(12) United States Patent
Trochan (10) Patent No.: US 8,621,789 B2
(45) Date of Patent: *Jan. 7, 2014

(54) STORM SHELTER AND METHOD OF USE THEREOF

(71) Applicant: Michael Francis Trochan, Ringwood, NJ (US)

(72) Inventor: Michael Francis Trochan, Ringwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,509

(22) Filed: Jan. 11, 2013

(65) Prior Publication Data

US 2013/0125478 A1    May 23, 2013

Related U.S. Application Data

(63) Continuation-in-part of application No. 13/178,563, filed on Jul. 8, 2011, now abandoned.

(51) Int. Cl.
*E04B 1/32* (2006.01)
*E04B 1/342* (2006.01)

(52) U.S. Cl.
USPC .................. 52/80.1; 52/84; 52/2.11; 52/2.17; 52/2.22

(58) Field of Classification Search
USPC .................................... 52/2.11, 2.17, 2.22, 84
See application file for complete search history.

(56) References Cited

U.S. PATENT DOCUMENTS

| 2,731,055 | A | * | 1/1956 | Smith .......................... 52/2.24 |
| 3,208,410 | A | | 9/1965 | Hayes et al. |
| 3,547,136 | A | | 12/1970 | Prinz et al. |
| 3,680,498 | A | | 8/1972 | Roos |
| 4,153,845 | A | | 5/1979 | Fava |
| 4,384,435 | A | | 5/1983 | Polise et al. |
| 4,400,623 | A | | 8/1983 | Jacobson |
| 4,835,800 | A | | 6/1989 | Johnson |
| 5,487,400 | A | | 1/1996 | Dawkins |
| 5,615,521 | A | | 4/1997 | Simerka |
| 5,893,238 | A | | 4/1999 | Peacock et al. |
| 6,200,067 | B1 | | 3/2001 | Pena |
| 6,840,013 | B2 | * | 1/2005 | South ........................... 52/2.15 |
| 7,442,949 | B2 | | 10/2008 | Foster |
| 7,721,749 | B2 | | 5/2010 | Brewin et al. |
| 8,079,182 | B1 | | 12/2011 | Higgins |
| 2005/0126082 | A1 | | 6/2005 | Boschma et al. |
| 2011/0265397 | A1 | | 11/2011 | Trochan |

* cited by examiner

*Primary Examiner* — Mark Wendell
(74) *Attorney, Agent, or Firm* — Mathew L. Grell; Balser & Grell IP Law (57) ABSTRACT

A transportable apparatus for shelter comprising two sections, a base section and a top section. The base section and the top section have cavities that can be filled with water or are pre-filled with foam. The top section may be cone-shaped or dome-shaped, and is dimensioned to be placed on the base section. After the top section is placed on the base section, the top section can be secured to the base section via bolts. Finally, both the top section and bottom section are divided into sections such that if one section develops a leak the other sections remain unaffected.

3 Claims, 6 Drawing Sheets

STORM SHELTER AND METHOD OF USE THEREOF

CROSS-REFERENCE TO RELATED APPLICATIONS

To the full extent permitted by law, the present application is a continuation-in-part of and claims priority to, and full benefit of, non-provisional patent application Ser. No. 13/178,563 entitled "STORM SHELTER AND METHOD OF USE THEREOF," filed on Jul. 8, 2011, the entire contents of which are hereby incorporated by reference.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The disclosure generally relates to a shelter, and more specifically to a transportable storm shelter.

2. Description of Related Art

Over the centuries, countless improvements have been made to the safety and efficiency of shelters, but providing a safe storm shelter that is easy to use and/or transport has remained a problem. To address this, structures have been built in the basement of a house, using the existing floor, with the structure typically resting against a wall of the basement. A problem with this approach was that if the home was destroyed, the occupants of the structure would be trapped.

Another approach was to utilize numerous wall pieces that could be mated together to supply a shelter. A problem with this approach was that the resultant structure was not sufficiently sturdy to withstand a storm, particularly if utilized outside of the house structure.

Yet another approach was to utilize an inflatable structure over which cement could be formed. A problem with this approach is that once the structure is built it was too heavy to move. Another problem is the time required to build the structure is extensive.

Therefore, it is readily apparent that there is a recognizable unmet need for a storm shelter which is easily transportable, yet strong and sturdy enough to withstand a storm.

SUMMARY

Briefly described, in a preferred embodiment, the present apparatus and method overcomes the above-mentioned disadvantages and meets the recognized need for a storm shelter and method of use by providing a transportable storm shelter. The apparatus preferably has a base section and a top section. The base section and the top section have cavities that can be filled with water to encumber the storm shelter. The top section is cone-shaped and is dimensioned to be placed on, and in contact with, the bottom of the base section. After the top section is placed on the base section, the top section is secured to the base section via bolts. Both the top section and bottom section are divided into sub-cavities such that if one sub-cavity develops a leak the other sub-cavities remain unaffected.

According to its major aspects and broadly stated, the present apparatus in its preferred form is a storm shelter comprising a top section, a base section and an enclosed area, the top section being conically shaped, the base section being dimensioned to receive the top section, and the enclosed area being disposed between the top section and the base section. The top section has a door, and base section is a truncated cone. The top section also has at least one segment, and wherein each segment has a water-fillable interior portion, a fill cap, and a drain cap. The base section also has at least one cell, and wherein each cell has a filling cap and a draining cap. The top section also has a window. The top section also has an exterior wall, and the door also has an exterior, and the door's exterior and the exterior wall provide a flush exterior surface, and the door is openable into the top section.

The door also has a window, and the conical top has four sub-chambers, and the base has four cells. The top section also has a skirt, and the base section also has a fringe, and the skirt and the fringe are near to, and in contact with, each other when the top section is disposed on the base section. The top section also has an upper terminus, and the base section has an upper surface, and the upper terminus is at least four feet higher than the upper surface. The skirt and the fringe each have stake holes, and the stake holes of the skirt and fringe are alignable when the top section is disposed on the base section. The skirt and fringe each have bolt holes, and the bolt holes of the skirt and fringe are alignable when the top section is disposed on the base section.

In use, a user places the base on the ground, and subsequently places the conical top over the base, the conical top having a door, and the door having a window. The user then opens the door inwardly into the conical top. The conical top has four sub-chambers, and the base has four cells, and the user fills each of the four sub-chambers and cells with water. The conical top also has a skirt, and the base also has a fringe, and the skirt has skirt bolt holes and skirt base holes, and the fringe has fringe bolt holes and fringe stake holes. The user secures a bolt through one of the skirt bolt holes and one of the fringe bolt holes, and also secures a stake through one of the skirt stake holes and one of the fringe stake holes, the stake being further secured into a ground surface.

In an alternate embodiment, the storm shelter has a cone-shaped top, the cone-shaped top having at least one chamber, and wherein each of the at least one chambers can be filled with water. The cone-shaped top also has a door, and the storm shelter also has an enclosed area, the enclosed area being disposed within the cone-shaped top. The storm shelter also has a base, and the base is a truncated cone, and the base is dimensioned to receive the cone-shaped top.

More specifically, the present disclosure of a preferred embodiment is a storm shelter, the storm shelter having a conical top, a base, an enclosed area, at least one bolt, at least one nut and at least one stake, the stake having a stake diameter. The conical top has an inside wall, an interior surface, an outside wall, an exterior surface, at least one chamber, an upper terminus, a door, a window, a hinge, a door frame, a diameter, a lightning rod, a wire, a grounding stake and a skirt. The at least one chamber preferably comprises a first sub-chamber, a second sub-chamber, a third sub-chamber, a fourth sub-chamber.

The first sub-chamber has a first sub-chamber fill cap and a first sub-chamber drain cap, the second sub-chamber has a second sub-chamber fill cap and a second sub-chamber drain cap, the third sub-chamber has a third sub-chamber fill cap and a third sub-chamber drain cap, and the fourth sub-chamber has a fourth sub-chamber fill cap and a fourth sub-chamber drain cap. The door has a window frame, a window hinge, door edges and a door exterior, and the window has window edges. The door frame has door frame edges, and the window frame has window frame edges. The skirt has a bolt hole and a stake hole, and the stake hole has a stake hole diameter.

The base has an upper surface, a platform, a bottom surface, an angled wall, a base bottom diameter, an interior cell, a first cell, a second cell, a third cell, a fourth cell and a fringe. The fringe has at least one fringe bolt hole and at least one fringe stake hole. The first cell has a first section fill cap and a first section drain cap, the second cell has a second section fill cap and a second section drain cap, the third cell has a third section fill cap and a third section drain cap, and the fourth cell has a fourth section fill cap and a fourth section drain cap.

The inside wall of the conical top is located within the outside wall, and the at least one chamber, adapted for receiving and containing a fluid, is located between the inside wall and the outside wall. The exterior surface is disposed on the outside wall opposite from the chamber, and the interior surface of the inside wall is located opposite the inside wall from the chamber. The enclosed area is disposed within the inside wall of the conical top.

A wire is electrically insulated from the surface of the conical top and is preferably disposed near the exterior surface. The wire is connected to the lightning rod and the grounding stake, and the wire, grounding stake and lightning rod are capable of transferring a lighting strike safely to the ground. It will be recognized by those skilled in the art that the wire may be disposed in any position that will allow electricity to be safely conducted from the lightning rod to the grounding stake.

The skirt is located at the bottom of the conical top, and the skirt extends radially outward from the outside wall. In a preferred embodiment, twelve bolt holes are located around the skirt equidistant from each other and twelve stake holes are located around the skirt equidistant from each other, there being fifteen degrees of arc between each bolt hole and the nearest stake holes. Alternately, there may be any number of bolt holes and stake holes, the bolt holes and stake holes being arranged around the skirt.

In a preferred embodiment the first sub-chamber has ninety degrees of arc. Similarly, the second sub-chamber, the third sub-chamber and the fourth sub-chamber preferably also have ninety degrees of arc.

The first sub-chamber fill cap is in fluid communication with the first sub-chamber, the first sub-chamber fill cap being disposed on the exterior surface near the upper terminus. The first sub-chamber drain cap is in fluid communication with the first sub-chamber, the first sub-chamber drain cap being disposed on the outer surface near the skirt.

The second sub-chamber fill cap is in fluid communication with the second sub-chamber, the second sub-chamber fill cap being disposed on the outer surface near the upper terminus. The second sub-chamber drain cap is in fluid communication with the second sub-chamber, the second sub-chamber drain cap being disposed on the outer surface near the skirt.

The third sub-chamber fill cap is in fluid communication with the third sub-chamber, the third sub-chamber fill cap being disposed on the outer surface near the upper terminus. The third sub-chamber drain cap is in fluid communication with the third sub-chamber, the third sub-chamber drain cap being disposed in the outer surface near the skirt.

The fourth sub-chamber fill cap is in fluid communication with the fourth sub-chamber, the fourth sub-chamber fill cap being disposed on the outer surface near the upper terminus.

The fourth sub-chamber drain cap is in fluid communication with the fourth sub-chamber, the fourth sub-chamber drain cap being disposed on the outer surface near the skirt.

It will be recognized by those skilled in the art that the first sub-chamber drain cap, second sub-chamber drain cap, third sub-chamber drain cap and fourth sub-chamber drain cap may alternatively be disposed anywhere proximate to the bottom of conical top. Similarly, the first sub-chamber fill cap, second sub-chamber fill cap, third sub-chamber fill cap and fourth sub-chamber fill cap may alternatively be disposed anywhere on conical top near the upper terminus. It will further be recognized by those skilled in the art that the conical top may have any number of chambers other than the four sub-chambers described herein.

In a preferred embodiment, the door is disposed in the conical top, the door being hingedly secured to the inside wall via a hinge, and the door edges peripherally surrounding the door. The door exterior is disposed on the door opposite the enclosed area. When closed, the door exterior and the conical top's exterior surface comprise a smooth, flush surface. In a preferred embodiment, the door's interior peripheral edge is dimensioned larger than the door's exterior peripheral edge, thereby preventing the door from opening away from the enclosed area.

The window is preferably hingedly secured to the door via the window hinge, the window being disposed within the door, the window edges peripherally surrounding the window, and the window being disposed within the window frame edges of the window frame. In a preferred embodiment, the window's interior peripheral edge is dimensioned larger than the window's exterior peripheral edge, thereby preventing the window from opening away from the enclosed area.

The storm shelter may optionally comprise additional windows, particularly a second window, disposed on the opposite side of the conical top from the first window. The second window is preferably hingedly secured to the inside wall, the second window being disposed within the conical top, and the second window edges peripherally surrounding the second window. In a preferred embodiment, the second window's interior peripheral edge is dimensioned larger than the second window's exterior peripheral edge, thereby preventing the second window from opening away from the enclosed area.

The fringe extends radially outward from the base. In a preferred embodiment, twelve fringe bolt holes are located around fringe equidistant from each other and twelve fringe stake holes are located around fringe equidistant from each other, there being fifteen degrees of arc between each fringe bolt hole and the nearest fringe stake holes. Alternately, there may be any number of fringe bolt holes and fringe stake holes, and the fringe bolt holes and the fringe stake holes are arranged in the fringe. The angled wall connects to the bottom surface of the base near the fringe.

In a preferred embodiment the first cell of the base has ninety degrees of arc. Similarly, the second cell, the third cell and the fourth cell preferably also have ninety degrees of arc. It will be recognized by those skilled in the art that the base may comprise any number of cells other than the four described, and the cells may individually have any number of degrees of arc.

The first section fill cap is in fluid communication with the first cell, the first section fill cap being disposed on the angled wall. Alternatively, the first section fill cap is disposed on the upper surface. The first section drain cap is in fluid communication with the first cell, and the first section drain cap is disposed on the angled wall near the fringe.

The second section fill cap is in fluid communication with the second cell, the second section fill cap being disposed on the angled wall. Alternatively, the second section fill cap is disposed on the upper surface. The second section drain cap is in fluid communication with the second cell, and the second section drain cap is disposed on the angled wall near the fringe.

The third section fill cap is in fluid communication with the third cell, the third section fill cap being disposed on the angled wall. Alternatively, the third section fill cap is disposed on the upper surface. The third section drain cap is in fluid communication with the third cell, and the third section drain cap is disposed on the angled wall near the fringe.

The fourth section fill cap is in fluid communication with the fourth cell, the fourth section fill cap being disposed on the angled wall. Alternatively, the fourth section fill cap is disposed on the upper surface. The fourth section drain cap is in fluid communication with the fourth cell, and the fourth section drain cap is disposed on angled wall near the fringe.

In use, the base is placed on the ground or another surface. The user fills the first cell via the first section fill cap, the second cell via the second section fill cap, the third cell via the third section fill cap and the fourth cell via the fourth section fill cap. The first cell, second cell, third cell and fourth cell are preferably filled with a liquid such as water, the liquid may be mixed with chemicals such as, for exemplary purposes only, calcium chloride, or other non-corrosive chemicals as are known in the art to lower the temperature of water's freezing point.

The conical top is subsequently placed over the base, the inside wall of the conical top being disposed near the angled wall. Alternately, the conical top could be placed over the base before filling the first cell, the second cell, the third cell and the fourth cell.

In a preferred embodiment, the base bottom diameter is dimensioned slightly less than, and nearly equal to, the conical diameter.

After the conical top is placed over the base, the conical top is adjusted so that the skirt bolt holes align with the fringe bolt holes and the skirt stake holes align with the fringe stake holes. The conical top is preferably selectively secured to the base by placing bolts through the skirt bolt holes and fringe bolt holes. Subsequently nuts are secured to the bolts. Preferably, a user drills stake holes into the ground, the stake holes having a stake hole diameter, and the stake diameter is dimensioned slightly greater than the ground hole diameter. The storm shelter is preferably selectively secured to the ground by placing stakes through the stake holes and fringe stake holes, the stakes preferably being secured into the holes in the ground.

The occupant subsequently fills the first sub-chamber via the first sub-chamber fill cap, the second sub-chamber via the second sub-chamber fill cap, the third sub-chamber via the third sub-chamber fill cap and the fourth sub-chamber via the fourth sub-chamber fill cap. The first sub-chamber, second sub-chamber, third sub-chamber and fourth sub-chamber are filled with a liquid, such as, for exemplary purposes only, water and optionally a freezing point lowering additive.

The occupant opens the door to enter the enclosed area of the storm shelter, and subsequent to entering the enclosed area, the occupant stands or sits on the platform of the base before closing the door. The occupant secures the door shut, and, from the safety of the enclosed area, the occupant can view the conditions outside via the window.

After bad weather has passed, the occupant opens the door to exit the storm shelter. To disassemble the storm shelter, the occupant opens the first sub-chamber drain cap, second sub-chamber drain cap, third sub-chamber drain cap and fourth sub-chamber drain cap, thereby allowing the liquid to drain from the first sub-chamber, second sub-chamber, third sub-chamber and fourth sub-chamber. Concurrently, or subsequently, the occupant removes the stakes and bolts from the storm shelter. Subsequently, the occupant removes the conical top from the base, and then opens the base's first section drain cap, second section drain cap, third section drain cap and fourth section drain cap, thereby allowing the liquid to drain from the first cell, second cell, third cell and fourth cell.

The conical top and the base preferably comprise a polymeric material. It will be recognized by those skilled in the art that the conical top and the base may comprise any material of sufficient strength that is suitable for containing a fluid.

In an alternate embodiment, the fringe and/or skirt of the conical top do not have bolt holes and the storm shelter does not utilize bolts or nuts. In use, the conical top and the base are secured together via stakes, the stakes also securing the storm shelter to the ground.

In another alternate embodiment, the skirt of the conical top does not have stake holes and the storm shelter does not utilize stakes. In use, the conical top and base are secured together via bolts and nuts, the apparatus relying on its weight alone to remain as a combined conical top and base unit.

In still other alternate embodiments, the storm shelter does not have a base. In use, the conical top is secured to the ground via stakes and/or utilizes its weight for securing the storm shelter to the ground.

In yet another alternate embodiment, the storm shelter has a top section that is dome-shaped, a base section dimensioned to receive the top section, an enclosed area therewithin, and a flange to assist securing the top and bottom sections, the flange having multiple holes for screws and/or bolts. The top section has a skirt, which has skirt opening(s), and the bottom section has footing notch(es) dimensioned to be received in the skirt opening(s). Preferably there are four skirt openings and footing notches, though any, preferably matching, number may be used.

The skirt has skirt holes and the bottom section comprises footing holes, both being designed to be aligned with each other and with the flange holes.

In use, the footing section is placed on ground, and the dome-shaped top is placed over the footing section, creating an enclosed area. A flange is then placed over the skirt. Finally, at least one securing stake or a bolt is secured through one of the flange holes, one of the skirt holes, and one of the fringe holes.

Accordingly, a feature and advantage of the storm shelter is its ability to provide a safe storm shelter.

Another feature and advantage of the storm shelter is its ability to be easily transported, assembled, used, and disassembled.

Still another feature and advantage of the storm shelter is its ability to be secured to the ground to retain the storm shelter fixed in place.

Yet another feature and advantage of the storm shelter is its ability to be selectively encumbered with additional weight, thereby preventing adverse weather conditions from moving the storm shelter.

Yet still another feature and advantage of the storm shelter is its ability to be rapidly assembled.

A further feature and advantage of the storm shelter is its ability to withstand damage and still retain functionality.

Another feature and advantage of the storm shelter is its ability to prevent the doors and windows from being forcibly opened outward by severe weather conditions.

These and other features and advantages of the storm shelter will become more apparent to one skilled in the art from the following Summary, Brief Description of the Drawings, Detailed Description, and Claims when read in light of the accompanying Detailed Drawings.

BRIEF DESCRIPTION OF THE DRAWINGS

The present storm shelter will be better understood by reading the Detailed Description of the Embodiments with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1A-6, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figures 1A, 1B:
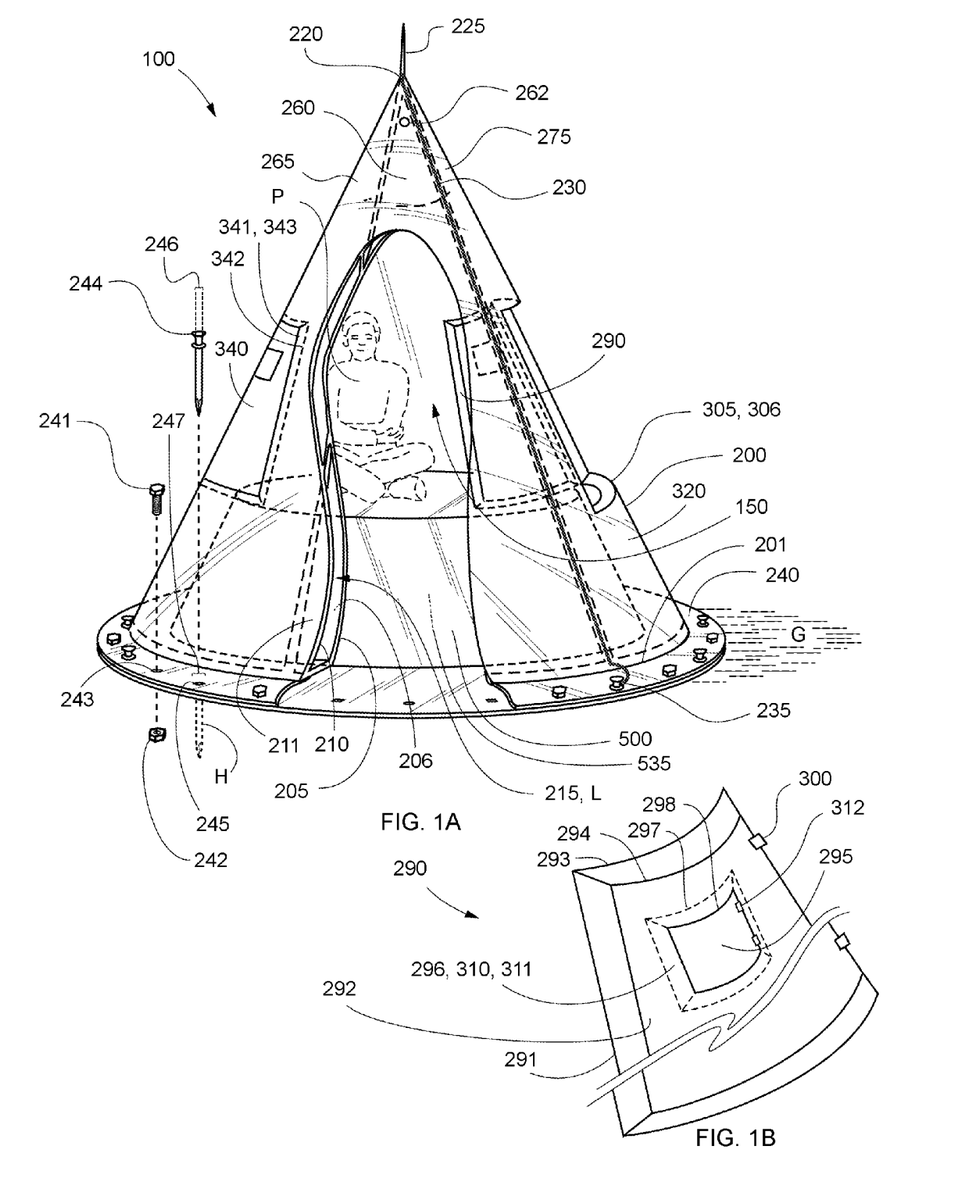
FIG. 1A is a perspective view of a storm shelter, according to an exemplary embodiment.
FIG. 1B is a detail perspective view of a door and window of the storm shelter of FIG. 1A.

Referring now to FIGS. 1A-3B, by way of example, and not limitation, therein is illustrated an example embodiment storm shelter 100, wherein storm shelter 100 preferably comprises conical top 200, base 500, enclosed area 150, one or more bolts 241, one or more nuts 242 and one or more stakes preferably comprising duplex spike 244, wherein each duplex spike 244 comprises stake diameter 246. Conical top 200 comprises bottom 201, inside wall 205, outside wall 210, chamber 215, upper terminus 220, skirt 240, door 290, window 295, second door 340, hinge 300, door frame 305, conical diameter 315 (best shown in FIG. 2A), lightning rod 225, wire 230, flush surface 320 and grounding stake 235. Skirt 240 comprises skirt bolt holes 243 dimensioned to receive bolts 241 and skirt stake holes 245, wherein skirt stake holes 245 comprises stake hole diameter 247. Inside wall 205 comprises interior surface 206, and wherein outside wall 210 comprises exterior surface 211. Chamber 215 comprises first sub-chamber 260, second sub-chamber 265, third sub-chamber 270 and fourth sub-chamber 275 (best shown in FIG. 3A). First sub-chamber 260 comprises first sub-chamber fill cap 262 and first sub-chamber drain cap 263, second sub-chamber 265 comprises second sub-chamber fill cap 267 and second sub-chamber drain cap 268, third sub-chamber 270 comprises third sub-chamber fill cap 272 and third sub-chamber drain cap 273, and fourth sub-chamber 275 comprises fourth sub-chamber fill cap 277 and fourth sub-chamber drain cap 278. Referring now more particularly to FIGS. 1A and 1B, door 290 comprises window frame 310, window hinge 312, door edges 291, door exterior 292, door interior peripheral edge 293 and door exterior peripheral edge 294. Door frame 305 comprises door frame edges 306, and window frame 310 comprises window frame edges 311. Window 295 comprises window edges 296, window interior peripheral edge 297 and window exterior peripheral edge 298. Similarly, second door 340 comprises second door edges 341, second door interior peripheral edge 342 and second door exterior peripheral edge 343.

Figure 2A:
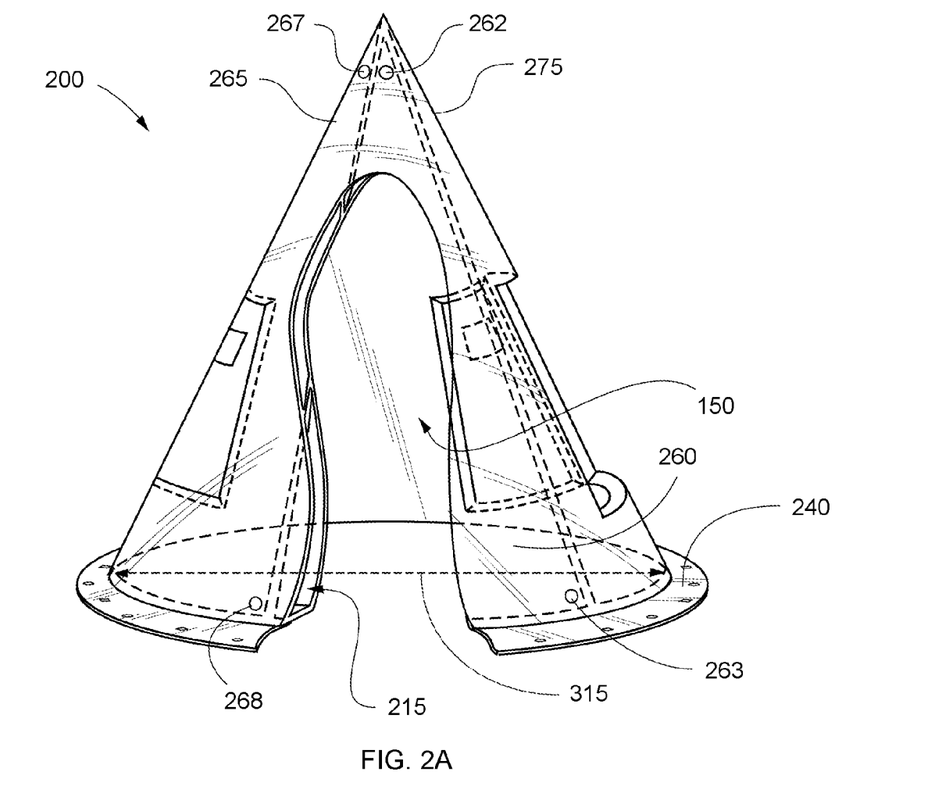
FIG. 2A is a perspective view of a top conical component of the storm shelter of FIG. 1A.
Figure 2B:
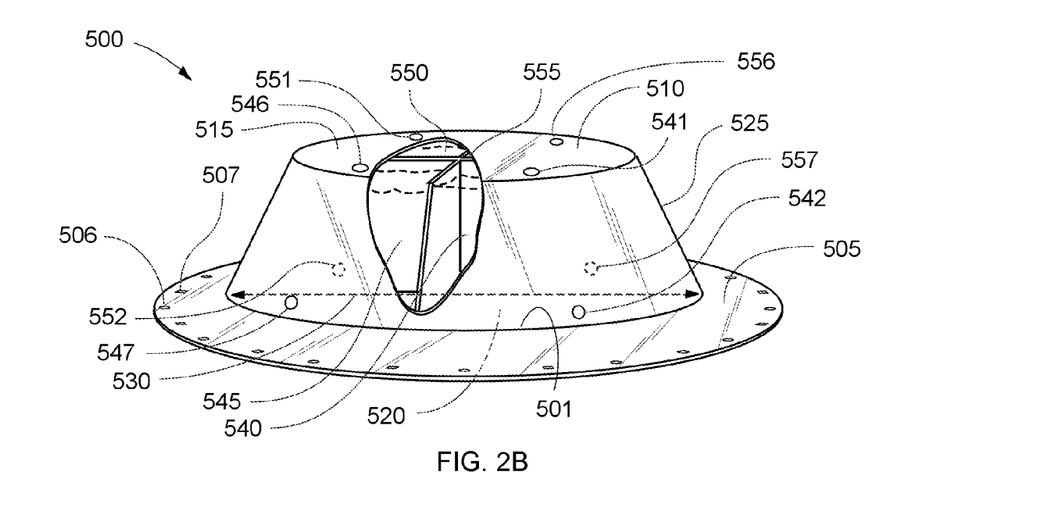
FIG. 2B is a perspective view of a truncated-conical base component of the apparatus of FIG. 1A.
Figure 3A:
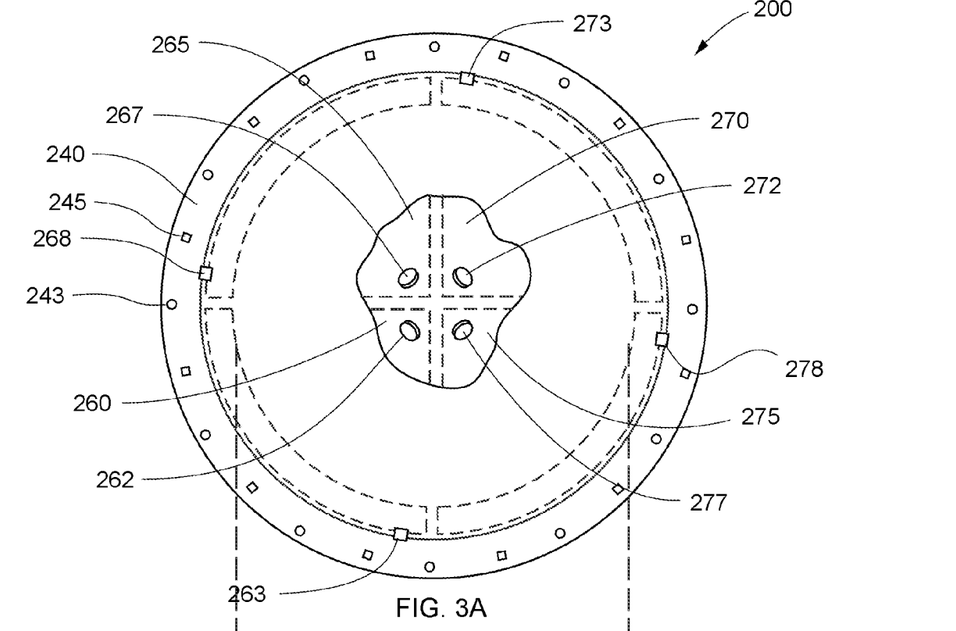
FIG. 3A is a detail top view of the conical top of the storm shelter of FIG. 1A, shown exploded from the base depicted in FIG. 3B.
Figure 3B:
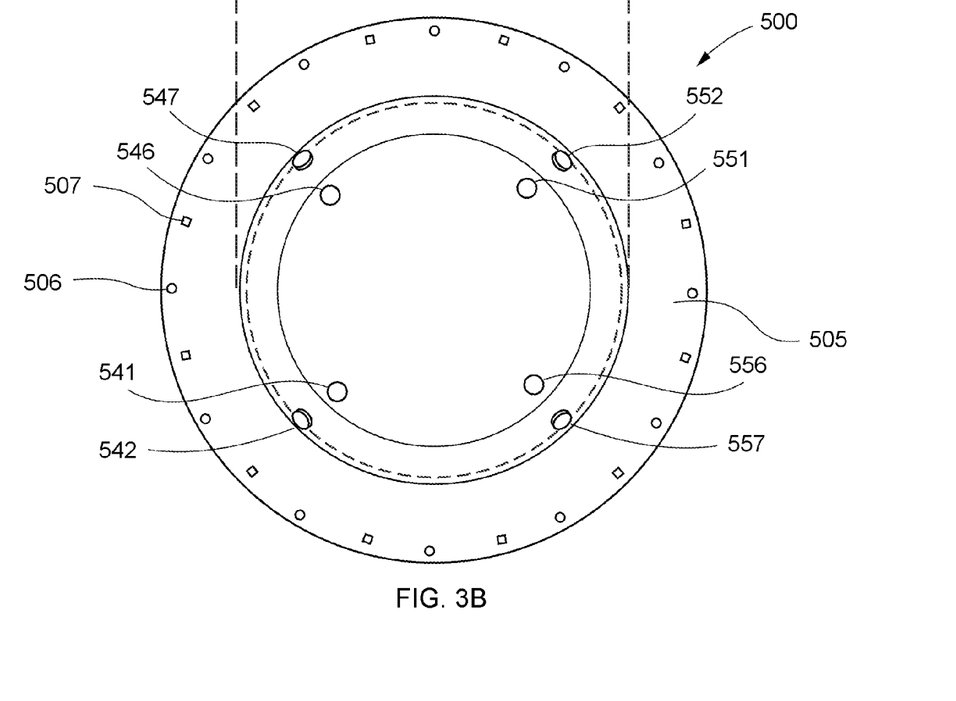
FIG. 3B is a detail top view of the base of the storm shelter of FIG. 1A, shown exploded from the conical top depicted in FIG. 3A.

Turning now more particularly to FIGS. 1A 2B, 3B, base 500 comprises a truncated cone having base bottom 501, upper surface 510, platform 515, bottom surface 520, angled wall 525, at least one interior cell 535, base bottom diameter 530, and fringe 505, wherein fringe 505 comprises at least one fringe bolt hole 506 and at least one fringe stake hole 507, and wherein interior cell 535 preferably comprises first cell 540, second cell 545, third cell 550 and fourth cell 555 (best shown in FIG. 2B). First cell 540 comprises first section fill cap 541 and first section drain cap 542, second cell 545 comprises second section fill cap 546 and second section drain cap 547, third cell 550 comprises third section fill cap 551 and third section drain cap 552, and fourth cell 555 comprises fourth section fill cap 556 and fourth section drain cap 557.

Returning now to FIG. 1A, inside wall 205 is disposed within outside wall 210, and chamber 215 is disposed between inside wall 205 and outside wall 210. Exterior surface 211 is disposed on outside wall 210 opposite from chamber 215, and interior surface 206 is disposed on inside wall 205 opposite from chamber 215. Enclosed area 150 is disposed within inside wall 205 of conical top 200.

Wire 230 is electrically insulated and is in electrical communication with lightning rod 225 and grounding stake 235, wherein lightning rod 225, wire 230 and grounding stake 235 transfer electricity from a lightning strike to ground G. It will be recognized by those skilled in the art that wire 230 may be disposed in any position that will allow electricity to be safely conducted from lightning rod 225 to grounding stake 235, and ultimately to ground G.

Skirt 240 is disposed at bottom 201 of conical top 200, wherein skirt 240 extends radially outward from outside wall 210. In a preferred embodiment, twelve skirt bolt holes 243 are located around skirt 240 equidistant from each other and twelve skirt stake holes 245 are located around skirt 240 equidistant from each other, wherein fifteen degrees of arc separate each skirt bolt hole 243 from nearest skirt stake holes 245. Alternately, there may be any number of skirt bolt holes 243 and skirt stake holes 245, wherein skirt bolt holes 243 and skirt stake holes 245 are disposed around skirt 240.

Conical top 200 and base 500 preferably comprise a polymeric material, such as, for exemplary purposes only, polyethylene. It will be recognized by those skilled in the art that conical top 200 and base 500 may comprise any material of sufficient strength that is not porous to water.

In a preferred embodiment, upper terminus 220 is approximately eight feet above bottom surface 520 of base 500, duplex spikes 244 are approximately three feet in length, inside wall 205 is disposed approximately six inches from outside wall 210, conical diameter 315 and base bottom diameter 530 are approximately eight feet long, platform 515 of base 500 is approximately three feet above bottom surface 520 of base 500, skirt 240 extends approximately three inches radially outward from bottom 201 of conical top 200, and fringe 505 extends approximately nine inches radially outward from base bottom 501 of base 500. It will be recognized by those skilled in the art that the dimensions referenced herein may be adjusted as required.

Turning now more particularly to FIGS. 1A and 3A, in a preferred embodiment first sub-chamber 260 of conical top 200 comprises ninety degrees of arc. Similarly, second sub-chamber 265, third sub-chamber 270 and fourth sub-chamber 275 preferably also comprise ninety degrees of arc.

First sub-chamber 260 is disposed between inside wall 205 and outside wall 210. First sub-chamber fill cap 262 is in fluid communication with first sub-chamber 260, wherein first sub-chamber fill cap 262 is disposed on exterior surface 211 proximate to upper terminus 220. First sub-chamber drain cap 263 is in fluid communication with first sub-chamber 260, wherein first sub-chamber drain cap 263 is disposed on outer surface 211 proximate to skirt 240.

Second sub-chamber 265 is disposed between inside wall 205 and outside wall 210. Second sub-chamber fill cap 267 is in fluid communication with second sub-chamber 265, wherein second sub-chamber fill cap 267 is disposed on outer surface 211 proximate to upper terminus 220. Second sub-chamber drain cap 268 is in fluid communication with second sub-chamber 265, wherein second sub-chamber drain cap 268 is disposed on outer surface 211 proximate to skirt 240.

Third sub-chamber 270 is disposed between inside wall 205 and outside wall 210. Third sub-chamber fill cap 272 is in fluid communication with third sub-chamber 270, wherein third sub-chamber fill cap 272 is disposed on outer surface 211 proximate to upper terminus 220. Third sub-chamber drain cap 273 is in fluid communication with third sub-chamber 270, wherein third sub-chamber drain cap 273 is disposed on outer surface 211 proximate to skirt 240.

Fourth sub-chamber 275 is disposed between inside wall 205 and outside wall 210. Fourth sub-chamber fill cap 277 is in fluid communication with fourth sub-chamber 275, wherein fourth sub-chamber fill cap 277 is disposed on outer surface 211 proximate to upper terminus 220. Fourth sub-chamber drain cap 278 is in fluid communication with fourth sub-chamber 275, wherein fourth sub-chamber drain cap 278 is disposed on outer surface 211 proximate to skirt 240.

It will be recognized by those skilled in the art that first sub-chamber drain cap 263, second sub-chamber drain cap 268, third sub-chamber drain cap 273 and fourth sub-chamber drain cap 278 may alternatively be disposed on any accessible portion of interior surface 206 proximate to skirt 240. Similarly, first sub-chamber fill cap 262, second sub-chamber fill cap 267, third sub-chamber fill cap 272 and fourth sub-chamber fill cap 277 may alternatively be disposed anywhere on conical top 200 proximate to upper terminus 220.

It will further be recognized by those skilled in the art that conical top 200 may comprise any number of chambers 215 other than the four chambers 215 described herein, wherein chambers 215 comprise degrees of arc other than ninety degrees.

Turning to FIGS. 1A and 1B, in a preferred embodiment door 290 is disposed in conical top 200, wherein door 290 is hingedly secured to inside wall 205 via hinge 300, and wherein door edges 291 peripherally surround door 290. Door exterior 292 is disposed on door 290 opposite from enclosed area 150. When door 290 is closed, door exterior 292 and exterior surface 211 comprise smooth, flush surface 320. In a preferred embodiment, door interior peripheral edge 293 is dimensioned larger than door exterior peripheral edge 294, thereby preventing door 290 from opening outwardly from enclosed area 150.

Window 295 is preferably hingedly secured to door 290 via window hinge 312, wherein window 295 is disposed within door 290, and wherein window edges 296 peripherally surround window 295, and wherein window 295 is disposed within window frame edges 311 of window frame 310. In a preferred embodiment, window interior peripheral edge 297 is dimensioned larger than window exterior peripheral edge 298, thereby preventing window 295 from opening outwardly from enclosed area 150.

Second door 340 is preferably hingedly secured to inside wall 205, wherein second door edges 341 peripherally surround second door 340. In a preferred embodiment, second door interior peripheral edge 342 is dimensioned larger than second door exterior peripheral edge 343, thereby preventing second door 340 from opening away from enclosed area 150.

Similar to door 290, second door 340 could comprise a window. Moreover, any number of doors and windows, whether openable or not, could be disposed on exterior surface 211 of conical top 200.

Turning now to FIG. 2B, fringe 505 extends radially outward from base bottom 501 base 500. Angled wall 525 extends between bottom surface 520 and platform 515. In a preferred embodiment, twelve fringe bolt holes 506 are located around fringe 505 equidistant from each other and twelve fringe stake holes 507 are located around fringe 505 equidistant from each other, wherein approximately fifteen degrees of arc separate each fringe bolt hole 506 from nearby fringe stake holes 507. Alternately, there may be any number of fringe bolt holes 506 and fringe stake holes 507, wherein fringe bolt holes 506 and fringe stake holes 507 are arranged around fringe 505.

In a preferred embodiment, first cell 540 of base 500 comprises approximately ninety degrees of arc. Similarly, second cell 545, third cell 550 and fourth cell 555 also each comprise approximately ninety degrees of arc. It will be recognized by those skilled in the art that base 500 could comprise any number of interior cells 535 other than the four described, and interior cells 535 could comprise degrees of arc other than ninety degrees.

First section fill cap 541 is in fluid communication with first cell 540, wherein first section fill cap 541 is disposed on upper surface 510. Alternatively, first section fill cap 541 could be disposed on angled wall 525. First section drain cap 542 is in fluid communication with first cell 540, wherein first section drain cap 542 is disposed on angled wall 525 proximate to fringe 505.

Second section fill cap 546 is in fluid communication with second cell 545, wherein second section fill cap 546 is disposed on upper surface 510. Alternatively, second section fill cap 546 could be disposed on angled wall 525. Second section drain cap 547 is in fluid communication with second cell 545, wherein second section drain cap 547 is disposed on angled wall 525 proximate to fringe 505.

Third section fill cap 551 is in fluid communication with third cell 550, wherein third section fill cap 551 is disposed on upper surface 510. Alternatively, third section fill cap 551 could be disposed on angled wall 525. Third section drain cap 552 is in fluid communication with third cell 550, wherein third section drain cap 552 is disposed on angled wall 525 proximate to fringe 505.

Fourth section fill cap 556 is in fluid communication with fourth cell 555, wherein fourth section fill cap 556 is disposed on upper surface 510. Alternatively, fourth section fill cap 556 could be disposed on angled wall 525. Fourth section drain cap 557 is in fluid communication with fourth cell 555, wherein fourth section drain cap 557 is disposed on angled wall 525 proximate to fringe 505.

In use, referring to FIGS. 1A, 2A and 2B, base 500 is placed on ground G or another surface. Occupant P fills first cell 540 via first section fill cap 541, second cell 545 via second section fill cap 546, third cell 550 via third section fill cap 551 and fourth cell 555 via fourth section fill cap 556. First cell 540, second cell 545, third cell 550 and fourth cell 555 are preferably filled with liquid L such as, for exemplary purposes only, water, wherein liquid L may include chemicals, such as, for exemplary purposes only, calcium chloride or other chemicals as are known in the art to decrease the freezing temperature of water.

Conical top 200 is subsequently placed over base 500, wherein inside wall 205 of conical top 200 is disposed proximate to angled wall 525 of base 500. In a preferred embodiment, base bottom diameter 530 (including wall thickness) of base 500 is dimensioned slightly less than, but close to, conical diameter 315 of conical top 200. Alternately, base bottom diameter 530 of base 500 is dimensioned proximate to conical diameter 315 of conical top 200.

After conical top 200 is placed over base 500, conical top 200 is adjusted so that skirt bolt holes 243 align with fringe bolt holes 506 and skirt stake holes 245 align with fringe stake holes 507. Conical top 200 is preferably selectively secured to base 500 via inserting bolts 241 through skirt bolt holes 243 and fringe bolt holes 506, wherein nuts 242 are subsequently secured to bolts 241. Preferably, occupant P drills holes H into ground G, wherein stake diameter 246 is dimensioned slightly greater than the diameter of holes H. Storm shelter 100 is preferably selectively secured to the ground via placing duplex spikes 244 through skirt stake holes 245 and fringe stake holes 507, wherein duplex spikes 244 preferably are secured into holes H.

Occupant P fills first sub-chamber 260 via first sub-chamber fill cap 262, second sub-chamber 265 via second sub-chamber fill cap 267, third sub-chamber 270 via third sub-chamber fill cap 272 and fourth sub-chamber 275 via fourth sub-chamber fill cap 277. First sub-chamber 260, second sub-chamber 265, third sub-chamber 270 and fourth sub-chamber 275 are preferably filled with liquid L, such as, for exemplary purposes, water.

Occupant P opens door 290 to enter enclosed area 150 of storm shelter 100, wherein subsequent to entering enclosed area 150, occupant P stands or sits on platform 515 of base 500 before closing door 290 (best shown FIG. 1A). Occupant P secures door 290 and can view the conditions outside via window 295 or second door 340 from the safety of enclosed area 150. Door 290, window 295 and second door 340 are securable, for exemplary purposes only, via a latch or other securing mechanisms as are known in the art.

After bad weather has passed, occupant P opens door 290 to exit storm shelter 100. To disassemble storm shelter 100, occupant P opens first sub-chamber drain cap 263, second sub-chamber drain cap 268, third sub-chamber drain cap 273 and fourth sub-chamber drain cap 278, thereby allowing liquid L to drain from first sub-chamber 260, second sub-chamber 265, third sub-chamber 270 and fourth sub-chamber 275, respectively. Occupant P removes duplex spikes 244 and bolts 241 from storm shelter 100. Occupant P removes conical top 200 from base 500, and then opens first section drain cap 542, second section drain cap 547, third section drain cap 552 and fourth section drain cap 557, thereby allowing liquid L to drain from first cell 540, second cell 545, third cell 550 and fourth cell 555, respectively.

In an alternate embodiment, storm shelter 100 is substantially equivalent in form and function to that of the preferred embodiment detailed above except as hereinafter specifically referenced. Specifically, skirt 240 of conical top 200 does not comprise skirt bolt holes 243, and fringe 505 of base 500 does not comprise fringe bolt holes 507. In use, conical top 200 and base 500 are selectively secured together via duplex spikes 244, wherein duplex spikes 244 also secure storm shelter 100 to ground G.

In another alternate embodiment, storm shelter 100 is substantially equivalent in form and function to that of the preferred embodiment detailed above except as hereinafter specifically referenced. Specifically, skirt 240 of conical top 200 does not comprise skirt stake holes 245, and fringe 505 of base 500 does not comprise fringe stake holes 507. In use, conical top 200 and base 500 are secured together via bolts 241 and nuts 242, relying upon the weight of liquid L and storm shelter 100 to secure storm shelter 100 to ground G.

In still another alternate embodiment, storm shelter 100 is substantially equivalent in form and function to that of the preferred embodiment detailed above except as hereinafter specifically referenced. Specifically, storm shelter 100 does not comprise base 500. In use, conical top 200 is selectively secured to the ground via duplex spikes 244 or without duplex spikes 244; in the latter case relying upon the weight of liquid L and storm shelter 100 to secure storm shelter 100 to ground G.

Figure 4:
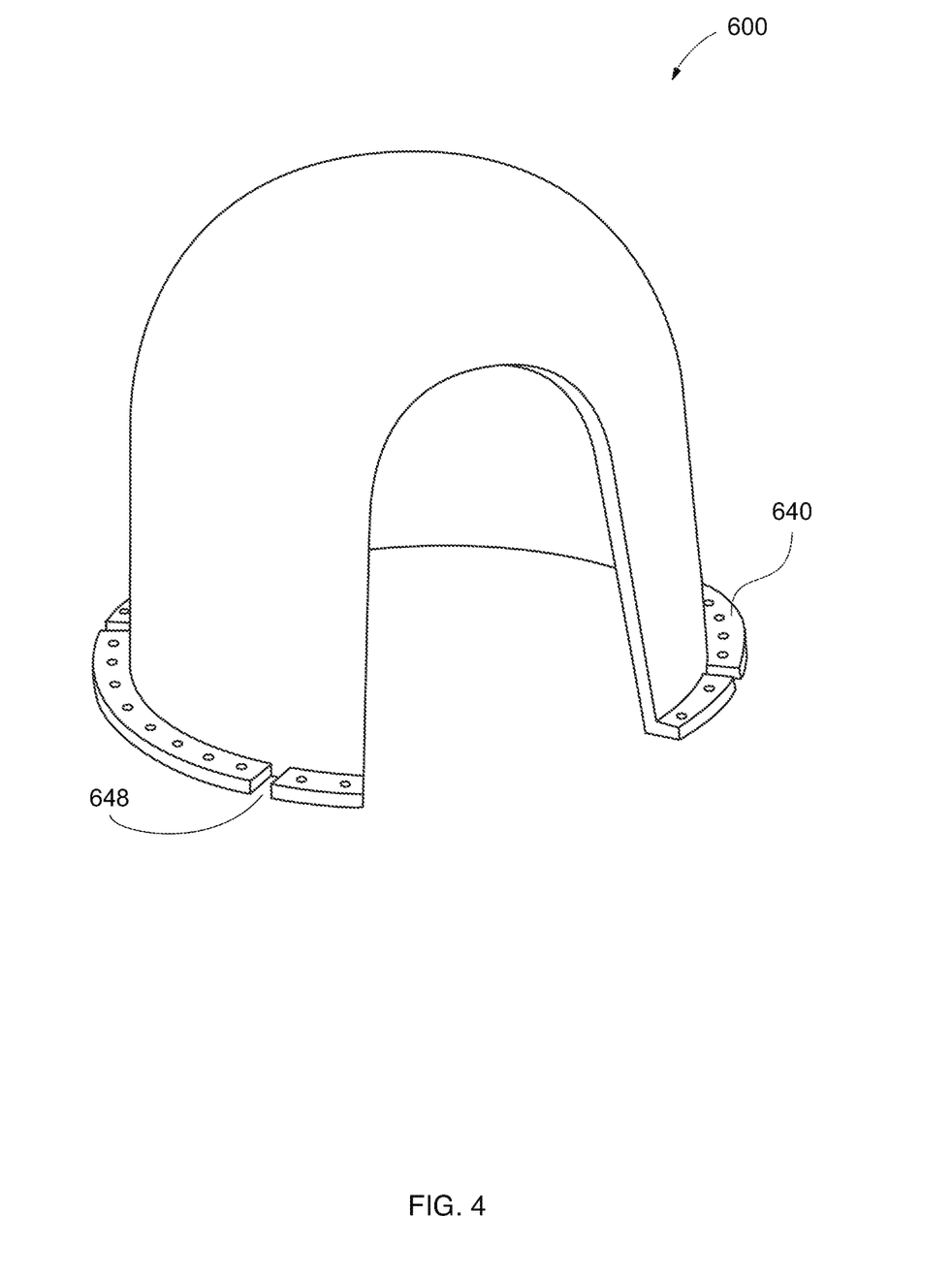
FIG. 4 is a perspective view of a dome-shaped storm shelter, according to an exemplary embodiment.
Figure 5:
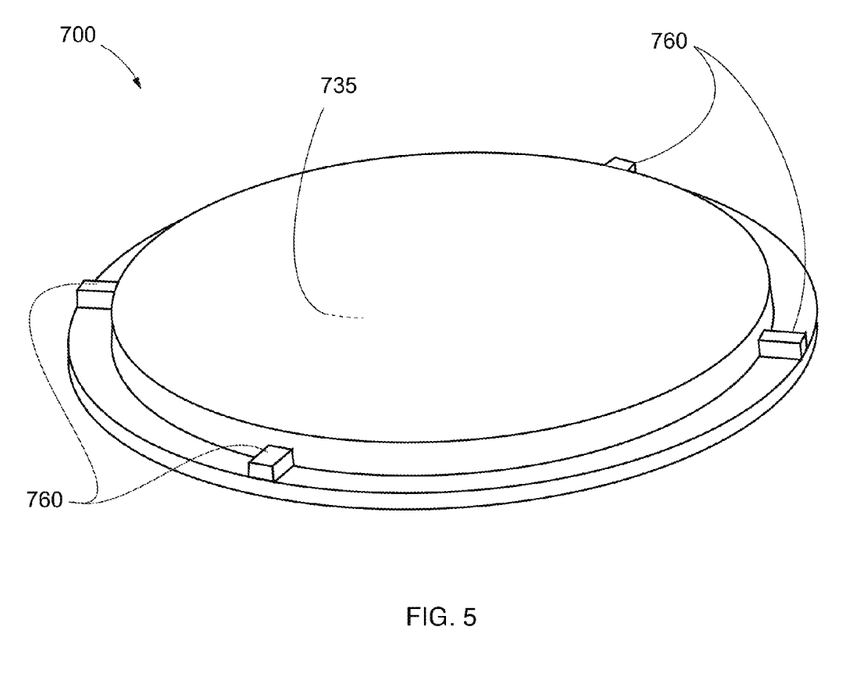
FIG. 5 is a perspective view of a base of a storm shelter, according to an exemplary embodiment.
Figure 6:
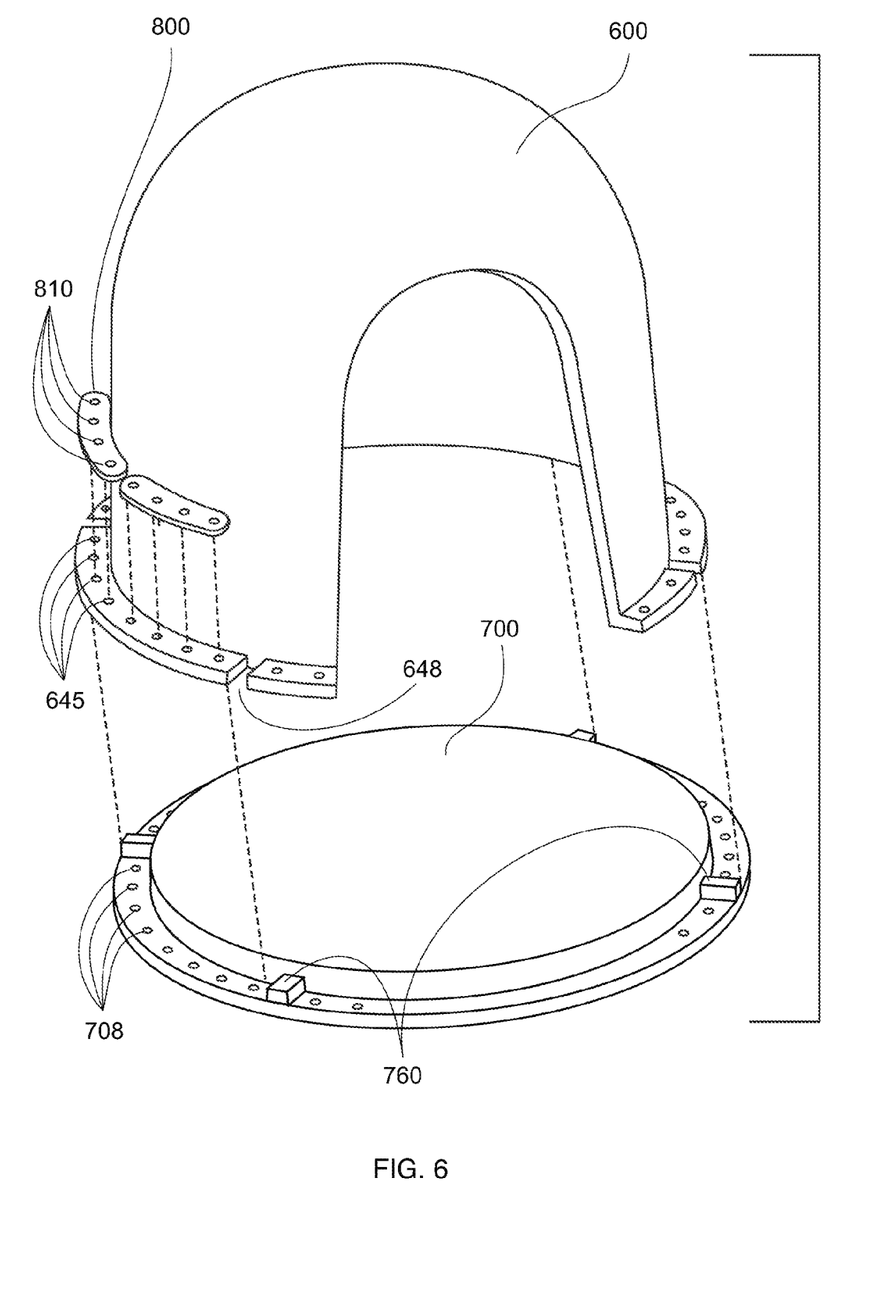
FIG. 6 is a perspective view of a dome-shaped storm shelter with a base, according to an exemplary embodiment.

Turning now to FIGS. 4-6, in yet another embodiment, storm shelter 100 comprises dome top 600, footing 700, and flange 800. Dome top 600 is dome-shaped and comprises dome skirt 640, wherein dome skirt 640 comprises skirt holes 645 and skirt opening 648. Footing 700 comprises footing holes 708, footing interior cell 735, and footing notch 760. Dome top 600 and footing 700 preferably comprise a weighted filler substance, such as, for exemplary purposes only and without limitation, foam, wood, and/or metal. Flange 800 comprises flange holes 810.

Turning more particularly to FIG. 6, in use, dome top 600 is placed onto footing 700, wherein skirt holes 645 are aligned with footing holes 708, and wherein footing notch 760 is disposed within skirt opening 648. Flange 800 is placed on dome skirt 640, wherein flange holes 810 are aligned with skirt holes 645. Bolts 241 and nuts 242 (not shown but similar to bolts and nuts shown in FIG. 1A) are affixed through flange holes 810, skirt holes 645, and footing holes 708. Alternatively, stakes 244 (not shown but similar to stakes shown in FIG. 1A) are affixed through flange holes 810, skirt holes 645, and footing holes 708.

It will be recognized that various components described above may be mixed and matched. For exemplary purposes only and without limitation, conical top 200 could be paired with footing 700, dome top 600 could be paired with base 500, and stakes 244 could be used in place of bolt 241 and nut 242. Further, flange 800 could be enlarged to comprise more flange holes 810 than shown in FIG. 6, or flange 600 could be reduced in size to comprise less flange holes 810.

Footing interior cell 735 comprises a foam material that is preferably sufficiently strong to support a person, and sufficiently heavy to hold storm shelter 100 in place, but yet sufficiently light to allow footing 700 to be moved. It will be recognized that footing interior cell 735 may comprise any material that preferably exhibits one of the above-discussed qualities.

The foregoing description and drawings comprise illustrative embodiments of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A storm shelter comprising:
    a top section, wherein said top section is dome-shaped, wherein said top section includes a dome skirt formed circumferentially and exterior of said top, and wherein said dome skirt comprises a plurality of skirt openings
    a base section, wherein said base section is dimensioned to receive said dome skirt of said top section, wherein said base section comprises a plurality of footing notches, and wherein said plurality of footing notches are dimensioned to be received by said plurality of skirt openings to align said top section and said base section;
    a plurality of flanges, wherein each said plurality of flanges comprises a plurality of flange holes, wherein said dome skirt comprises skirt holes, and wherein said bottom section comprises footing holes, and wherein said flange holes are disposed proximate to said skirt holes, and wherein said skirt holes are disposed proximate to said footing holes; and
    an enclosed area, wherein said enclosed area is disposed between said top section and said base section.

2. The storm shelter of claim 1, wherein said top section and said bottom section each comprise a material selected from the group consisting of foam, polymeric, polyethylene, and combinations thereof.

3. The storm shelter of claim 1, wherein said top section comprises a door, and wherein said door has a window.

* * * * *